Patented Jan. 12, 1943

2,308,425

UNITED STATES PATENT OFFICE 2,308,425

TREATMENT OF WELLS

Charles A. Prince, Shreveport, La., assignor to The Dow Chemical Company, Midland, Mich., a corporation of Michigan No Drawing. Application April 6, 1938, Serial No. 200,430

4 Claims. (Cl. 166—21)

The invention relates to an improved method of bringing about a reduction in the permeability of earth or rock formations to the flow of fluids. It more particularly concerns an improved method of bringing about the deposition of a cementing material within the pores of the formation penetrated by the bore of a well.

In drilling deep wells such as, for example, oil wells, the bore of the well may penetrate earth or rock bearing water, brine or other undesirable fluids. It is usually necessary to exclude these encroaching fluids from the well by sealing or cementing off the portions of the formation producing them, because otherwise the oil flowing into the well is either contaminated or, in some cases, actually prevented from entering the well by the excessive flow of these fluids.

In an effort to shut off the infiltration of such undesirable fluids into the well it is the conventional practice to attempt to force a cement slurry consisting of a suspension of cement particles in water into the pores and interstices of the offending portion of the formation. However, I have found that there are disadvantages attending the use of this method. One serious disadvantage inherent in the use of this method lies in the fact that the slurry can be forced into the pores and interstices of earth and rock formations only if such pores are considerably larger than the individual cement particles. Since it often happens that many of the pores are relatively small, the cement slurry cannot be forced into these strata even by the application of very great pressures. Instead the cement particles filter out on the walls of the well bore as pressure is applied, and substantially none of the cement slurry penetrates deeply into the formation. A further disadvantage in the use of the method is due to the fact that the cement particles filtering out on the walls of the well bore do not bond strongly with the walls because such wall surfaces are usually relatively smooth, or in some cases the walls may be oily and do not afford a surface to which cement will adhere strongly. Thus by the use of the conventional method an effective seal is not usually produced because the cement slurry cannot be forced into the formation and the cement depositing on the wall surfaces cannot be made to adhere strongly to the walls of the well bore so as to effectively seal the formation.

It is, therefore, an object of the invention to provide an improved method of cementing the bore of a deep well, whereby the infiltration of undesirable fluids into the well may be substantially if not entirely prevented.

Another object of the invention is to provide an improved method of sealing earth and rock formations penetrated by a well bore with a cement slurry, whereby the slurry can be forced into the earth or rock formation without the application of excessive pressure.

Still another object of the invention is to provide a method of treating the wall surfaces of the well bore so that cement will readily and strongly bond therewith.

Other objects and advantages will appear as the description of the invention proceeds.

I have found that the foregoing objects can be attained and new and improved results obtained as regards the effectiveness of the seal produced by carrying out a cementing operation according to the following improved method. In carrying out the method of the invention, a suitable acid reagent capable of dissolving constituents of the formation is first introduced into the well and forced into the formation or such portions thereof as are to be cemented or sealed off. The acid reagent penetrating into the pores of the formation reacts with the constituents of the formation, greatly enlarging the pores and flow channels. At the same time the acid also acts on the walls of the well bore, cleaning the surface of oil or other matter, and in dissolving portions of the walls, renders them rough or pitted, thus providing a surface to which cement will readily bond and strongly adhere. A cement slurry is then forced into these enlarged pores or flow channels and against the walls of the well bore and held in place until solidification and consequent sealing occurs.

Several acid reagents are available which are suitable for the purpose at hand. In general when the earth or rock formation to be cemented is of a calcareous nature or contains calcareous constituents, I prefer to employ an aqueous solution of hydrochloric acid, nitric acid, or mixtures thereof, although sulfuric acid may be advantageously used where the formation of insoluble sulfates does not cause difficulty. Such acid solutions readily decompose calcareous rock, rendering it highly porous, whereby it is readily penetrated by cement slurries of the conventional type. The spent acid, being largely a calcium chloride solution, also facilitates the setting of the cement. If, however, the formation to be cemented is of a sandy or silicious nature, a mixture of hydrofluoric acid or certain of the fluoride salts and hydrochloric, nitric, or sulfuric acid, such as is described in United States Patents Nos. 2,011,579 and 2,094,479, is preferably employed to bring about the desired increase in pore size before the cement slurry is forced into the desired formation or portions thereof.

Any of the commonly used cements, such as Portland cement or other hydraulic cements, may be suitably employed to carry out the cementing operation, although in some instances it may be desirable to use a special cement, such as one of those developed to meet conditions of high temperature. A generally suitable mixture to employ consists of a suspension of Portland cement in water weighing between about 13 to 16 pounds per gallon. The amount of cement required to complete a cementing operation depends, of course, on the extent of the formation to be sealed off by the cement. In general from 10 to 100 or more sacks of the commonly used cements produce satisfactory results.

The following description is illustrative of a mode of carrying out the invention in an oil well drilled into calcareous earth or rock formations to shut off excessive flow of gas into the well from a section of the formation overlying an oil producing stratum. That portion of the well bore located below the section of the formation producing gas is first temporarily sealed off to prevent the possibility of partially plugging the oil producing stratum in the lower portion of the well bore with cement. This temporary seal may be obtained by running a formation packer into the well on the lower end of the tubing and setting it at a point just below the section of the formation producing the gas. The tubing is then disconnected from the packer and its lower end then located opposite the section of the formation producing the gas. The well is then filled with a liquid, preferably immiscible with the acid reagent, such as, for example, oil. The acid reagent, which may contain an inhibitor capable of retarding the action of acid on the metal parts of the well, is introduced into the well through the tubing and the oil or other liquid filling the well is allowed to escape at the casing head until the volume of acid introduced into the well is sufficient to fill the tubing and that portion of the well bore opposite the section of the formation to be treated. The casing head is then closed in and pressure is applied to the acid reagent to force it into the section of the formation producing the gas, while maintaining pressure upon the liquid in the casing to prevent the acid rising in the well bore. After the desired quantity of the acid reagent has been injected into the selected portion of the formation, it is allowed to remain in place for a time to insure sufficient reaction to bring about enlargement of the pores and flow channels. Usually from 100 to 500 gallons of the acid reagent gives satisfactory results, although more may be required in some cases, depending on the thickness of the portion of the formation to be cemented. After the reaction of the acid and the rock is substantially complete, which usually requires from about 1 to 4 hours, the cement slurry is introduced into the well and pressure is applied thereto to displace it from the well bore into the porous section to be sealed, it not being necessary to withdraw the spent acid before injecting the cement because the presence of the spent acid in the pores facilitates the setting and adherence of the cement to the pore walls. Any excess cement not forced into the formation is circulated out of the well through the tubing by applying fluid pressure at the casing head, while maintaining pressure on the cement, if necessary, to prevent its returning to the well bore. The cement is held in place until solidification occurs, after which the packer is removed and the well put into production.

Sometimes modifications of the method just described may be advantageously employed. For example, if sufficient time is not allowed for the acid to become completely reacted or the cement slurry is introduced directly after the acid, a quantity of a separating liquid such as water or oil may be advantageously introduced into the well between the acid reagent and the cement slurry to prevent possible contact with the two, since the acid reacts with and may destroy the cement.

It is to be understood that while the method of applying the invention has been described with particular reference to its use in an oil well for sealing off a gas stratum from which an excessive volume of gas is escaping into the well bore, the method may be applied similarly in any cementing practice wherein it is necessary to force a cement slurry into a formation having a relatively small pore size.

Among the advantages of the invention are that cement slurry can be injected deeply into the formation without the application of excessive pumping pressures, the cement can be made to adhere or bond strongly to the walls of the well bore, and a more effective seal can be produced by the use of cement than was hitherto possible.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of producing an adherent cement lining on a section of a well bore penetrating an acid-soluble earth or rock formation, the steps which include setting a packer so as to seal the portion of the well bore to be cemented from the remaining portion of the well bore, introducing a quantity of acid containing a corrosion inhibitor of the corrosive attack of acid on iron and steel into the well bore, applying pressure so as to displace the acid into the so-sealed portion of the formation, and thereafter introducing a quantity of cement slurry into the well so as to form a sheath on the acid treated wall of the well bore, whereby the cement is bonded to the formation by a portion of the cement entering the pores enlarged by the acid.

2. In a method of producing an adherent cement lining on at least a portion of the wall of a well bore penetrating an acid-soluble earth or rock formation, the steps which include sealing off the portion of the well bore to be treated with cement from the remaining portion of the well bore, introducing an acid solution into the well bore so as to bring it into contact with the section to be treated with cement, displacing the acid solution into the formation, introducing a quantity of cement slurry into the well bore and applying pressure thereto whereby the cement slurry is forced against the wall of the well bore and is bonded to the bore wall by a portion of the cement entering the pores enlarged by the acid, and thereafter removing the excess cement from the well bore so as to leave the well bore wall lined with a cement sheath.

3. In a method of producing an adherent cement lining on a section of a well bore penetrating an acid-soluble earth or rock formation, the steps which include sealing off the portion of the well bore to be treated with cement from the remaining portion of the well bore, introducing a quantity of acid solution into the well bore so as to bring it in contact with the section to be treated with cement, and thereafter introducing a quantity of cement slurry into the well and applying pressure thereto whereby the cement is bonded to the formation by a portion of the cement entering the pores enlarged by the acid.

4. In a method of producing an adherent cement lining on a section of a well bore penetrating an acid-soluble earth or rock formation, the steps which include sealing off the portion of the well bore to be treated with cement from the remaining portion of the well bore, introducing an acid solution into the well bore so as to bring it into contact with the section to be treated with cement, introducing a quantity of water into the well bore and applying pressure thereto to displace the acid and water into the formation, introducing a quantity of cement slurry into the well bore so as to form a sheath on the acid treated wall of a well bore whereby the cement is bonded to the formation by a portion of the cement entering the pores enlarged by the acid.

CHARLES A. PRINCE.